UNITED STATES PATENT OFFICE.

OTTO WULFF, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

RED WOOL DYESTUFFS AND PROCESS OF MAKING SAME.

1,154,826.  Specification of Letters Patent.  Patented Sept. 28, 1915.

No Drawing.  Application filed October 17, 1914.  Serial No. 867,196.

*To all whom it may concern:*

Be it known that I, OTTO WULFF, Ph. D., chemist, a citizen of the Empire of Germany, residing at Höchst-on-the-Main, Germany, have invented certain new and useful Improvements in Red Wool Dyestuffs and Processes of Making Same, of which the following is a specification.

I have found that a scarlet-red acid dyestuff is obtained by causing diazotized ortho-anilin-sulfonic acid to act upon 2-amino-8-naphthol-6-sulfonic acid in acid solution. The dyestuff thus produced is distinguished not only by the beautiful tint it yields, but also by its excellent property of dyeing evenly and its eminent fastness to light.

The following example illustrates my invention: 17.3 kilos of ortho-anilin-sulfonic acid are diazotized in the usual manner. After the diazotization is complete, there is added a suspension, acidified with a mineral acid, of 24 kilos of 2-amino-8-naphthol-6-sulfonic acid, whereupon the mineral-acid reaction is gradually neutralized by adding sodium acetate accordingly as the coupling process proceeds. When the coupling is finished, the mass is rendered alkaline and the dyestuff which in this case has the composition—

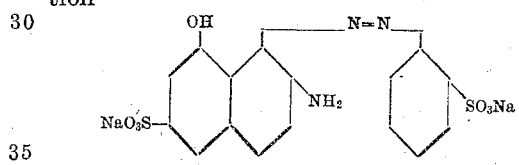

being a red powder, readily soluble in water, very little soluble in alcohol, insoluble in ligroin and petroleum and dyeing wool in an acid bath a red tint of great fastness to light, and is separated in the usual manner.

Having now described my invention, what I claim is:

1. As new products, the dyestuffs of the formula:

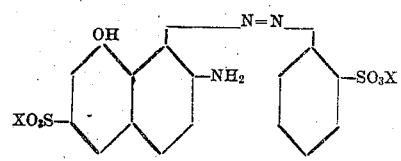

wherein "X" stands for a metal, being red powders, readily soluble in water, very little soluble in alcohol, insoluble in ligroin and petroleum and dyeing wool in an acid bath red tints of great fastness to light.

2. As a new product, the dyestuff of the formula:

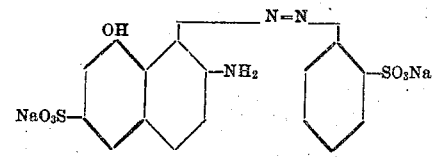

being a red powder, readily soluble in water, very little soluble in alcohol, insoluble in ligroin and petroleum and dyeing wool in an acid bath a red tint of great fastness to light.

3. As a new process, the manufacture of a red wool-dyestuff by combining diazotized ortho-anilin-sulfonic acid with 2-amino-8-naphthol-6-sulfonic acid in acid solution.

In testimony whereof I affix my signature in presence of two witnesses.

OTTO WULFF.

Witnesses:
 JEAN GRUND,
 CARL GRUND.